United States Patent
Mondragón Avelar et al.

(10) Patent No.: US 11,874,154 B2
(45) Date of Patent: Jan. 16, 2024

(54) FUEL LEVEL SENSOR WITH SPRING-LOADED WIPER CONTACTS

(71) Applicant: Ford Global Technologies, LLC, Dearborn, MI (US)

(72) Inventors: José David Mondragón Avelar, Tepotzotlan (MX); Sebastian Rosas Contreras, Mexico City (MX); Miguel Angel Benitez Torreblanca, El Campanario (MX); Tanya Stephany Soriano Canchola, Tlalnepantla (MX)

(73) Assignee: Ford Global Technologies, LLC, Dearborn, MI (US)

(*) Notice: Subject to any disclaimer, the term of this patent is extended or adjusted under 35 U.S.C. 154(b) by 82 days.

(21) Appl. No.: 17/451,297

(22) Filed: Oct. 18, 2021

(65) Prior Publication Data
US 2023/0121572 A1   Apr. 20, 2023

(51) Int. Cl.
*G01F 23/36* (2006.01)
*B60K 15/03* (2006.01)

(52) U.S. Cl.
CPC ............ *G01F 23/363* (2013.01); *B60K 15/03* (2013.01); *B60K 2015/03217* (2013.01)

(58) Field of Classification Search
CPC .................. G01F 23/363; B60K 15/03; B60K 2015/03217
USPC ............................. 73/313, 314; 338/194, 202
See application file for complete search history.

(56) References Cited

U.S. PATENT DOCUMENTS

| | | | | |
|---|---|---|---|---|
| 1,474,312 A | * | 11/1923 | Wyman | H02P 1/18 338/202 |
| 2,278,846 A | * | 4/1942 | Goerth | H01H 29/00 338/156 |
| 2,666,101 A | * | 1/1954 | Ellithorpe | H01H 19/58 200/16 R |
| 3,486,271 A | * | 12/1969 | Feikema | A63H 18/16 446/455 |
| 3,876,967 A | * | 4/1975 | Hehl | H01C 10/38 338/159 |
| 4,295,295 A | * | 10/1981 | Brand | A63H 18/12 446/457 |
| 4,920,798 A | * | 5/1990 | Weaver | G01F 23/68 73/322.5 |
| 6,021,668 A | * | 2/2000 | Sawert | G01F 23/36 338/92 |
| 6,269,695 B1 | * | 8/2001 | Cesternino | G01F 23/60 338/33 |
| 6,425,288 B1 | * | 7/2002 | Pauer | G01F 23/36 73/317 |
| 6,564,631 B1 | | 5/2003 | Lake et al. | |

(Continued)

FOREIGN PATENT DOCUMENTS

CN   208968630 U   6/2019
EP   2312282 A1   4/2011
(Continued)

*Primary Examiner* — John Fitzgerald
(74) *Attorney, Agent, or Firm* — Vincent Mastrogiacomo; McCoy Russell LLP

(57) ABSTRACT

Methods and systems are provided for a fuel delivery system and a fuel level sensor assembly thereof. In one example, a fuel level sensor includes a wiper assembly with spring-loaded wiper contacts. Cylindrical springs are provided between a wiper housing and the contacts to bias the wiper contacts into contact with a resistive card.

12 Claims, 10 Drawing Sheets

(56) References Cited

U.S. PATENT DOCUMENTS

| | | | |
|---|---|---|---|
| 6,792,800 B2* | 9/2004 | Tsuda | G01F 23/36 |
| | | | 338/33 |
| 6,868,724 B2 | 3/2005 | Brzozowski et al. | |
| 6,886,403 B2 | 5/2005 | LaBarge et al. | |
| 7,043,982 B2* | 5/2006 | Sims, Jr. | G01F 23/363 |
| | | | 73/313 |
| 7,062,967 B2 | 6/2006 | Hale et al. | |
| 7,091,819 B1 | 8/2006 | Forgue | |
| 7,409,860 B2 | 8/2008 | Ferreira et al. | |
| 7,591,178 B2 | 9/2009 | Ireland et al. | |
| 8,643,496 B2* | 2/2014 | Fukuhara | G01F 23/363 |
| | | | 340/625 |
| 9,892,829 B2* | 2/2018 | Kim | H01C 10/28 |
| 10,794,751 B2 | 10/2020 | Kim et al. | |
| 2004/0007062 A1* | 1/2004 | Ireland | G01F 23/363 |
| | | | 73/317 |
| 2004/0255669 A1* | 12/2004 | LaBarge | G01F 23/363 |
| | | | 73/304 R |
| 2011/0041600 A1 | 2/2011 | Porras et al. | |
| 2015/0300869 A1* | 10/2015 | Klein | G01F 23/363 |
| | | | 73/317 |
| 2018/0335333 A1* | 11/2018 | Porras | H01C 10/32 |

FOREIGN PATENT DOCUMENTS

| | | |
|---|---|---|
| EP | 3404376 A1 | 11/2018 |
| JP | 2007003519 A | 1/2007 |
| KR | 101785387 B1 | 10/2017 |

* cited by examiner

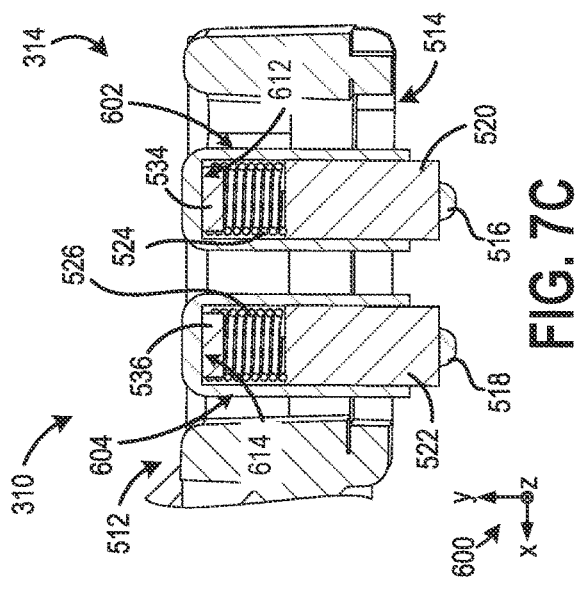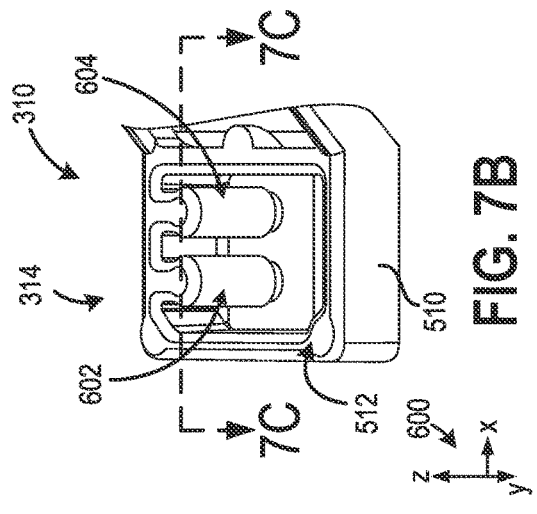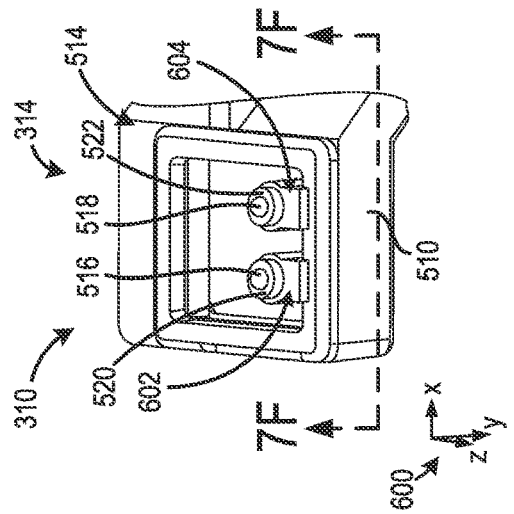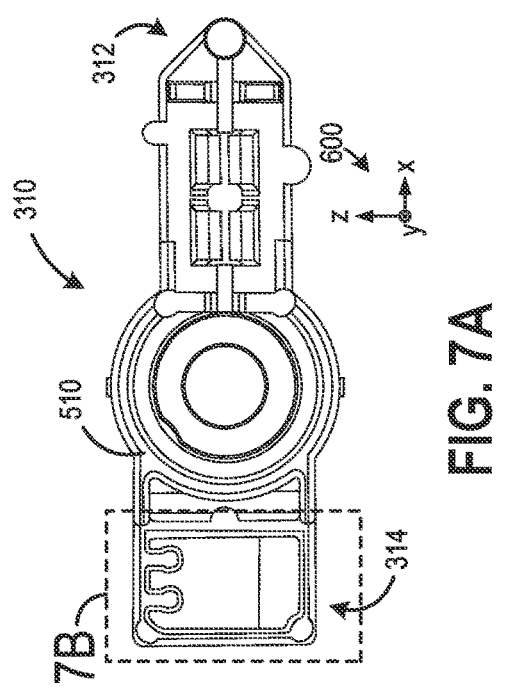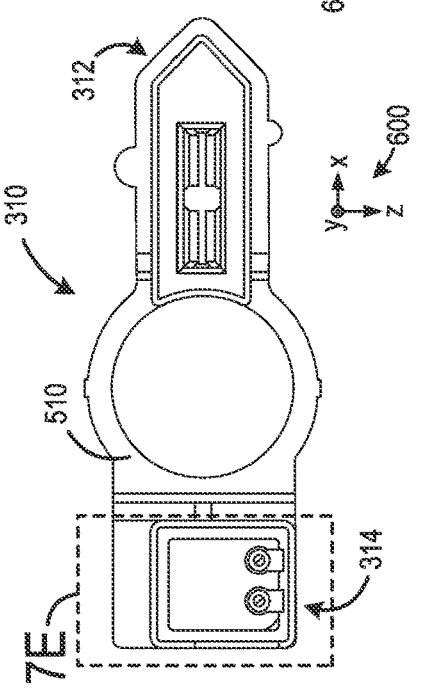

FUEL LEVEL SENSOR WITH SPRING-LOADED WIPER CONTACTS

FIELD

The present description relates generally to a fuel level sensor assembly within a fuel delivery system in a vehicle.

BACKGROUND/SUMMARY

Some vehicles, particularly hybrid electric vehicles (HEVs) and combustion engine vehicles, include fuel delivery systems with a fuel level sensor (FLS) assembly that is arranged within a fuel tank. Certain FLS assemblies utilize a float within the fuel tank and a float arm that extends therefrom and engages a wiper assembly. In these systems, the wiper assembly includes conductive contacts which move along conductive tracks on a substrate as the wiper rotates in accordance with vertical displacement of the float arm, in response to changes in the fuel level. Rotation of the wiper assembly varies the resistance between the conductive contacts along the conductive ink tracks. This resistance may then be measured by a Powertrain Control Module (PCM) and matched with a fuel gauge to provide indication of the fuel level.

U.S. Pat. No. 6,886,403 B2 to LaBarge et al. teaches an FLS that includes a wiper assembly with a contact assembly. The contact assembly includes two contact arms with contacts that move along conductive ink tracks on a resistor card. The contact arms extend from the contact assembly towards the resistor card and act as cantilever beams that are intended to contact the resistor card as the wiper assembly rotates.

The inventors have recognized several drawbacks with LaBarge's FLS, and particularly the configuration of the wiper and conductive contact assembly. For instance, the contact assembly taught by LaBarge may be unreliable due to permanent inoperability caused by wiper assembly degradation or the temporary loss of contact between the wiper assembly and the card. Fuel slosh, and other external factors, may cause the temporary loss of contact while the contact assembly's vulnerability to degradation (e.g., permanent deformation) during manufacturing, assembly (due to incorrect handling), and, in some cases, operation may cause sensor inoperability. For example, in an operational position, when the cantilevered contact arms are touching the resistive card, permanent deformation may occur while inner faces of the contact arms are in tension and outer faces of the contact arms are compressed. This permanent deformation can cause the assembly's "free" height (defined as the distance between the contact portions of the conductive arms and a base of the wiper assembly) to be altered to an extent which would prevent appropriate contact between the contact portions and the resistive card during operation, interrupting or completely stopping a current flow along the resistive ink tracks between the contact portions suitable for fuel level detection. LaBarge's FLS as well as other previous sensors may therefore experience inaccurate readings and in some cases become permanently inoperable which may result in triggering of a Diagnostic Trouble Code (DTC) and ultimately lead to customer dissatisfaction as well as returns and replacement, in some instances.

To resolve at least a portion of the aforementioned issues, the inventors have developed an FLS wiper assembly. In one example, the wiper assembly includes at least two conductive track contacts each designed to contact a conductive ink track on a card. The assembly further includes at least two cylindrical springs positioned between the at least two conductive track contacts and a conductive internal plate. Even further, the assembly includes a wiper housing that includes at least two openings that at least partially enclose the conductive internal plate and the two cylindrical springs. By positioning springs between the conductive track contacts and the conductive internal plate, a spring force is applied to the conductive track contacts, urging the contacts toward the card to maintain continuity of a circuit across the card during operation. Specifically, in one example, the two cylindrical springs may be compressed when installed in the wiper assembly. As such, the conductive track contacts are spring-loaded within the wiper assembly and biased outward from the wiper assembly and towards the card. In this way, the FLS may more confidently measure an electrical resistance in said circuit, throughout the operable range of motion of the wiper assembly, when compared to sensors with cantilevered wiper contacts, even under conditions where external noise sources cause undesired wiper assembly loading (e.g., side loading from fuel slosh within the fuel tank). The cylindrical springs may also be stronger and less prone to degradation than wiper contacts profiled as cantilever beams.

In another example, the conductive internal plate may include at least two spring contacting protrusions and a body that extends between the at least two spring contacting protrusions. Further, in such an example, the conductive internal plate may be over-molded in the housing, and the at least two spring contacting protrusions may be arranged at the bases of the at least two openings. In this way, the conductive internal plate may be robustly incorporated into the housing, thereby reducing the chance of deformation of the components due to undesirable handling during assembly and operation thereof. Consequently, the likelihood of inaccurate fuel level readings and sensor inoperability is reduced, thereby increasing customer satisfaction.

In another example, the two openings may be formed as hollow cylinders. Housing the springs in the hollow cylinders protects the springs from degradation. Further, when assembling the FLS, the springs may be efficiently mated with the hollow cylinders. The reliability of the FLS is further increased as a result.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7A-7F show different views of the assembled wiper housing of the FLS wiper assembly, with FIGS. 7E-7F illustrating cross-sectional views thereof.

FIGS. 3A-10 are shown approximately to scale. However, other relative component dimensions may be used, in other embodiments.

DETAILED DESCRIPTION

The following description relates to systems and methods for determining a level of fuel in a fuel tank based on electrical resistance in a fuel level sensor (FLS). The FLS includes a wiper assembly with spring-loaded contacts slide along conductive ink tracks on a resistive card in response to changes in fuel level. Cylindrical springs may be positioned between the wiper housing and the contacts and said springs may also be in contact with an internal conductive plate that is at least partially enclosed within the FLS housing. Such an arrangement may provide confident and reliable detection of a fuel level based on a resistance measured by the FLS.

Figure 1:
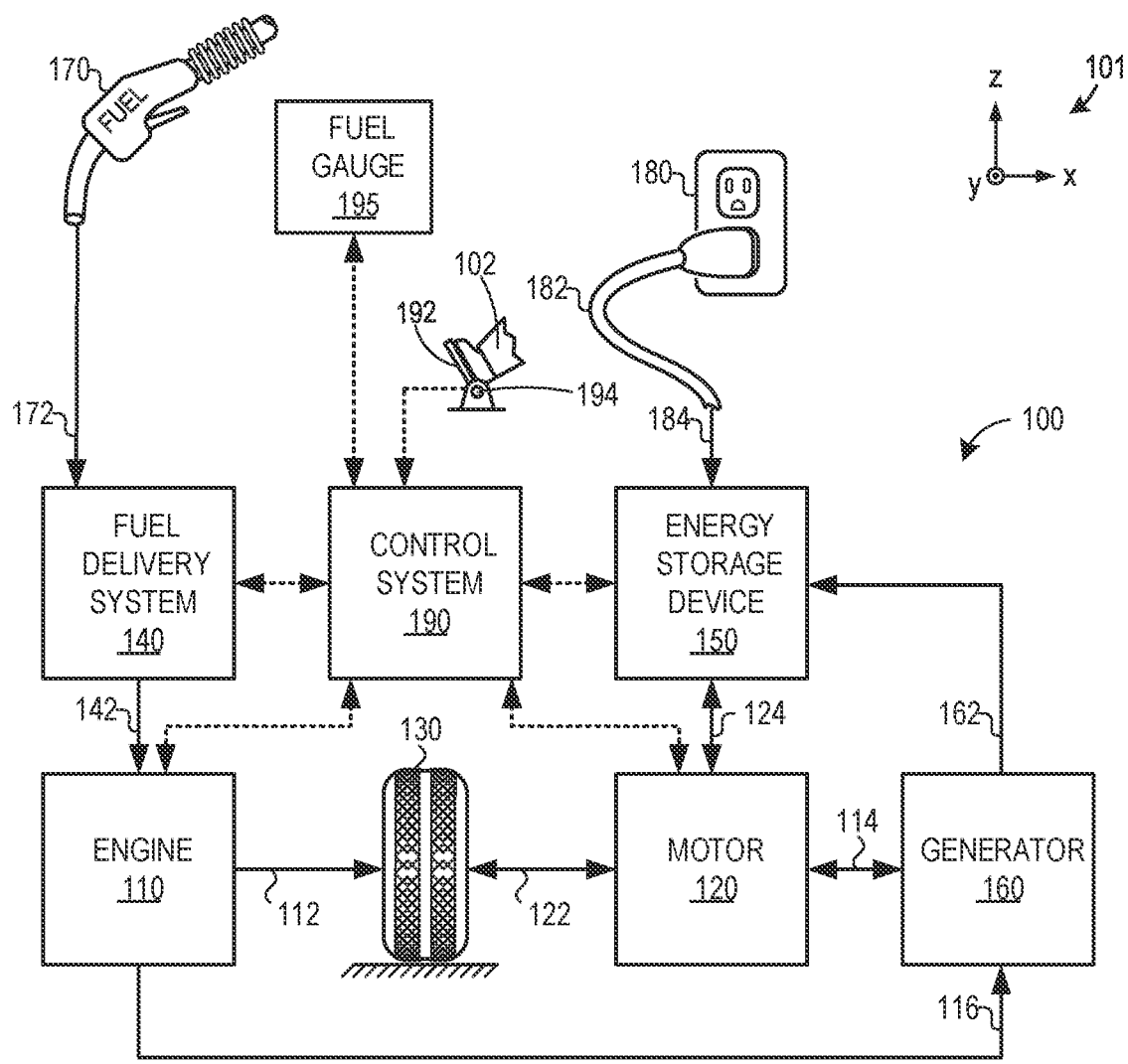
FIG. 1 shows a high-level block diagram illustrating an example vehicle system.
Figure 2:
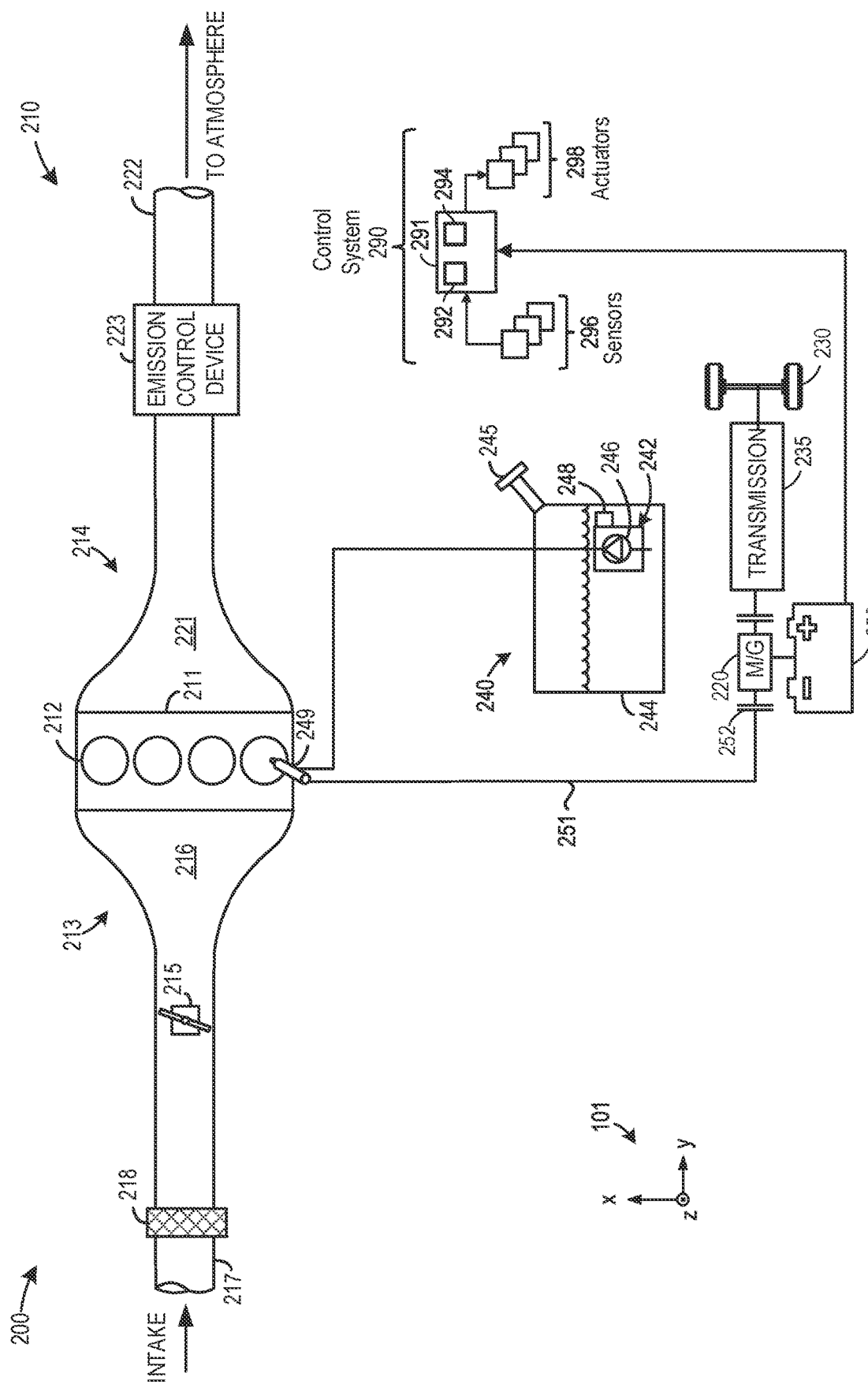
FIG. 2 shows a schematic diagram of another example vehicle with a fuel delivery system.
Figure 5:
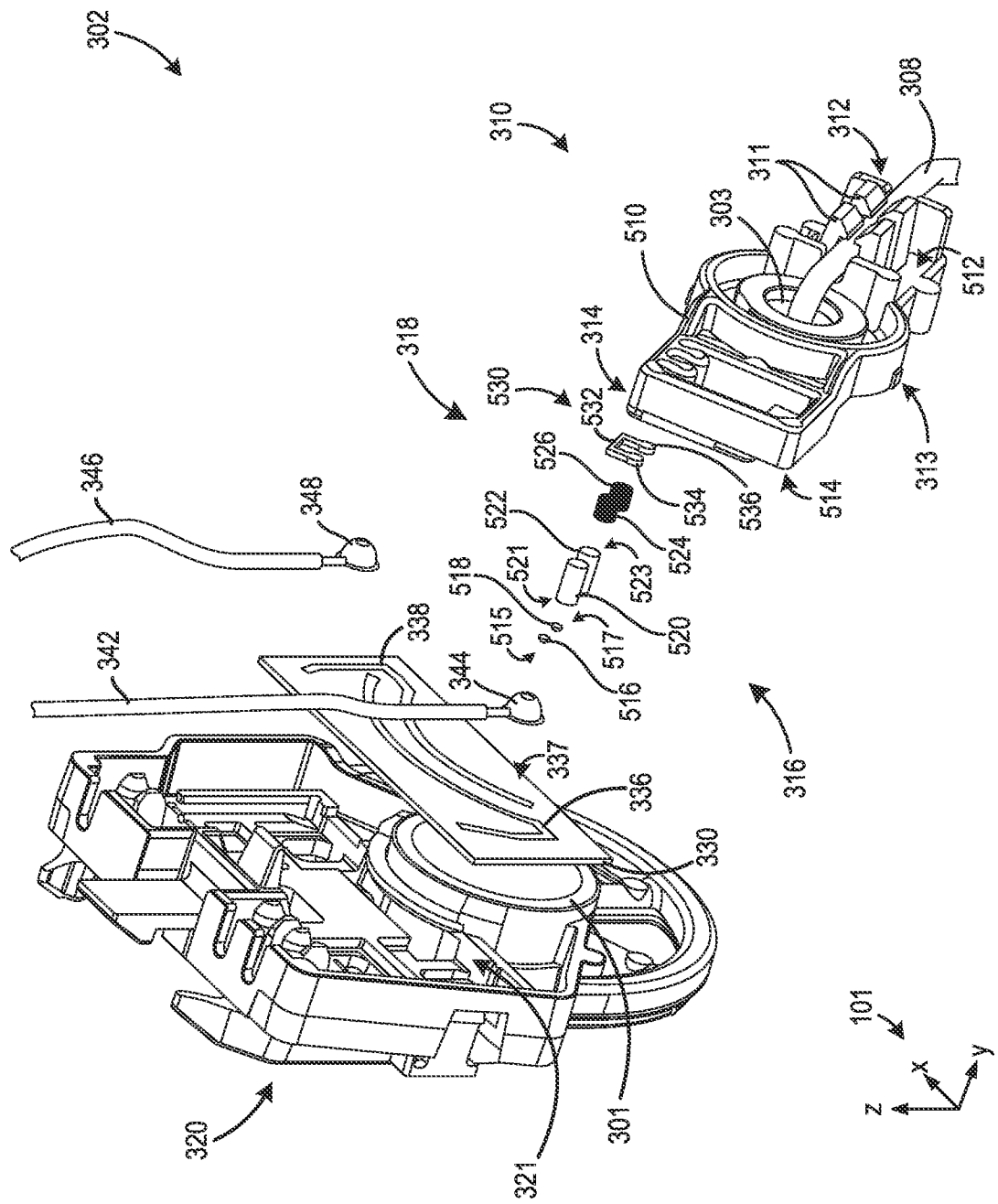
FIG. 5 shows an exploded view of the FLS shown in FIGS. 3A-4B.
Figure 6:
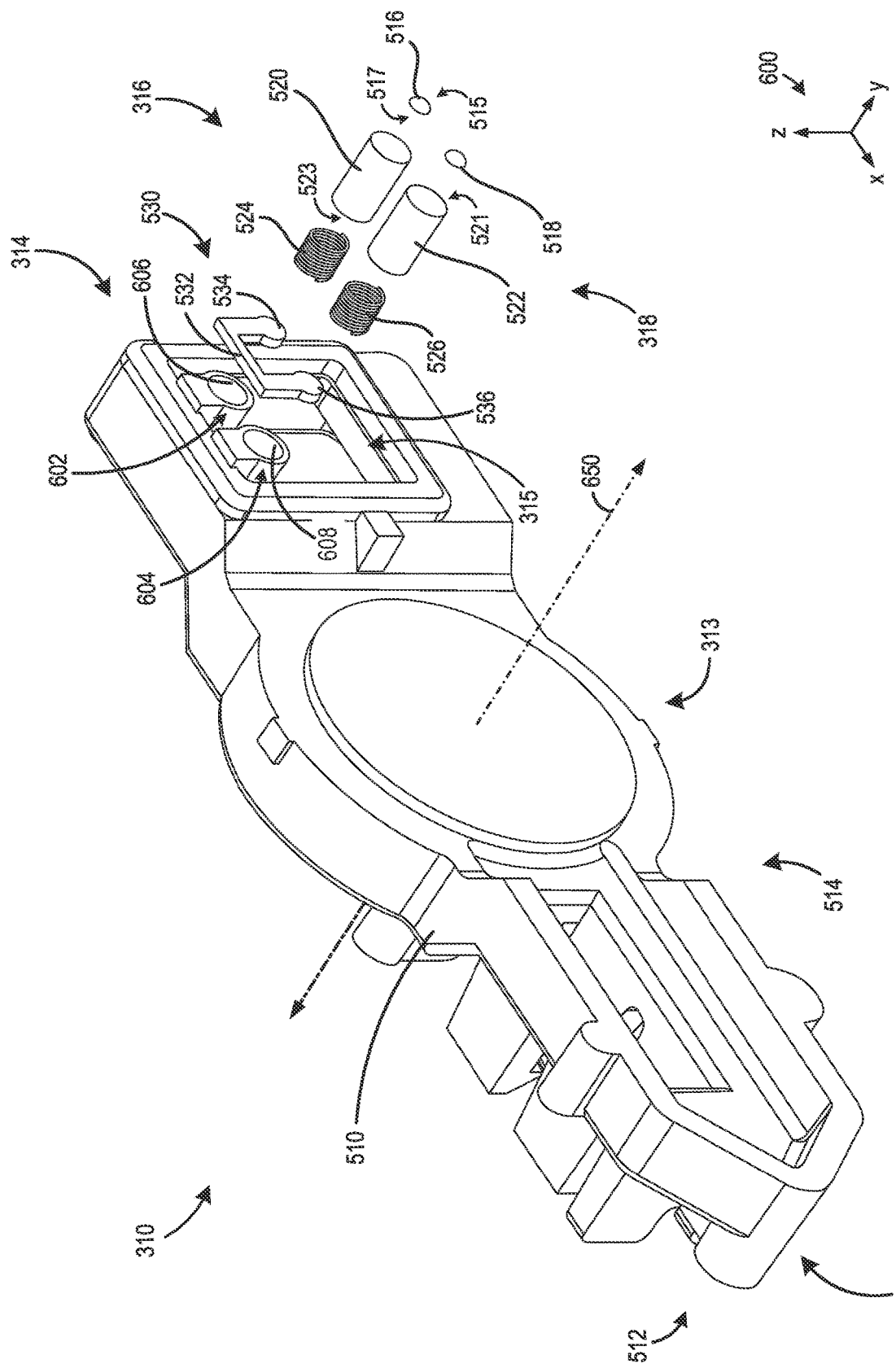
FIG. 6 illustrates an exploded view of a portion of the FLS wiper assembly, particularly illustrating the components of the FLS wiper assembly.
Figure 8:
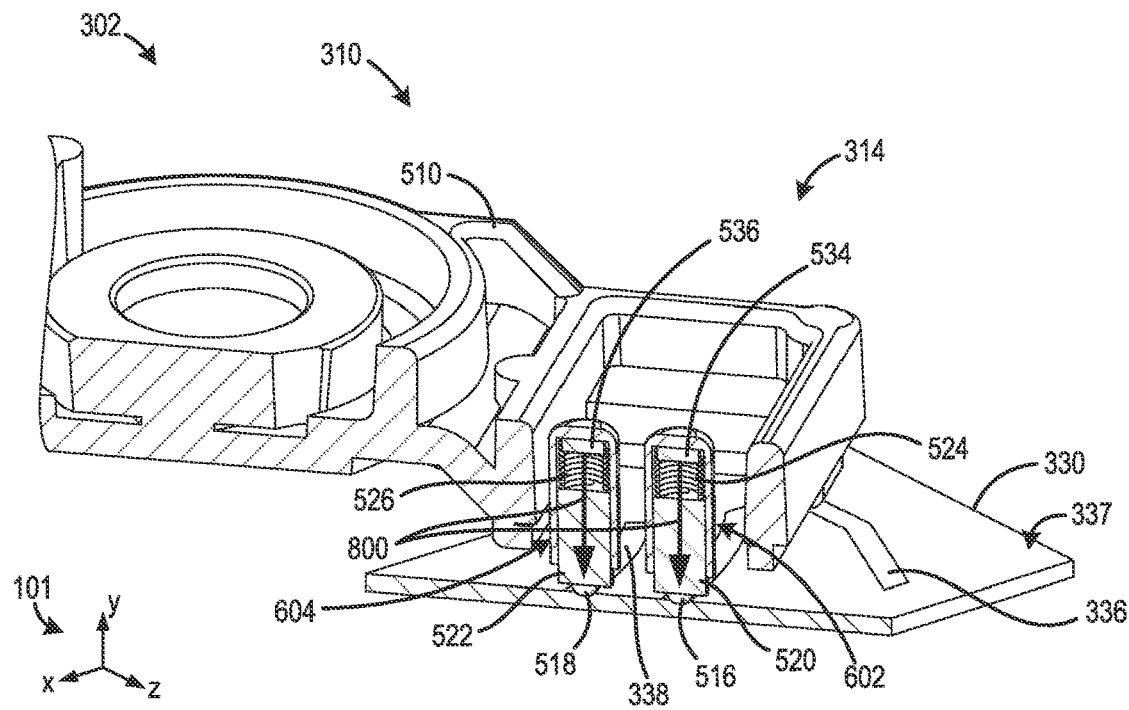
FIGS. 8-9 show the FLS wiper assembly in an assembled configuration.
Figure 9:
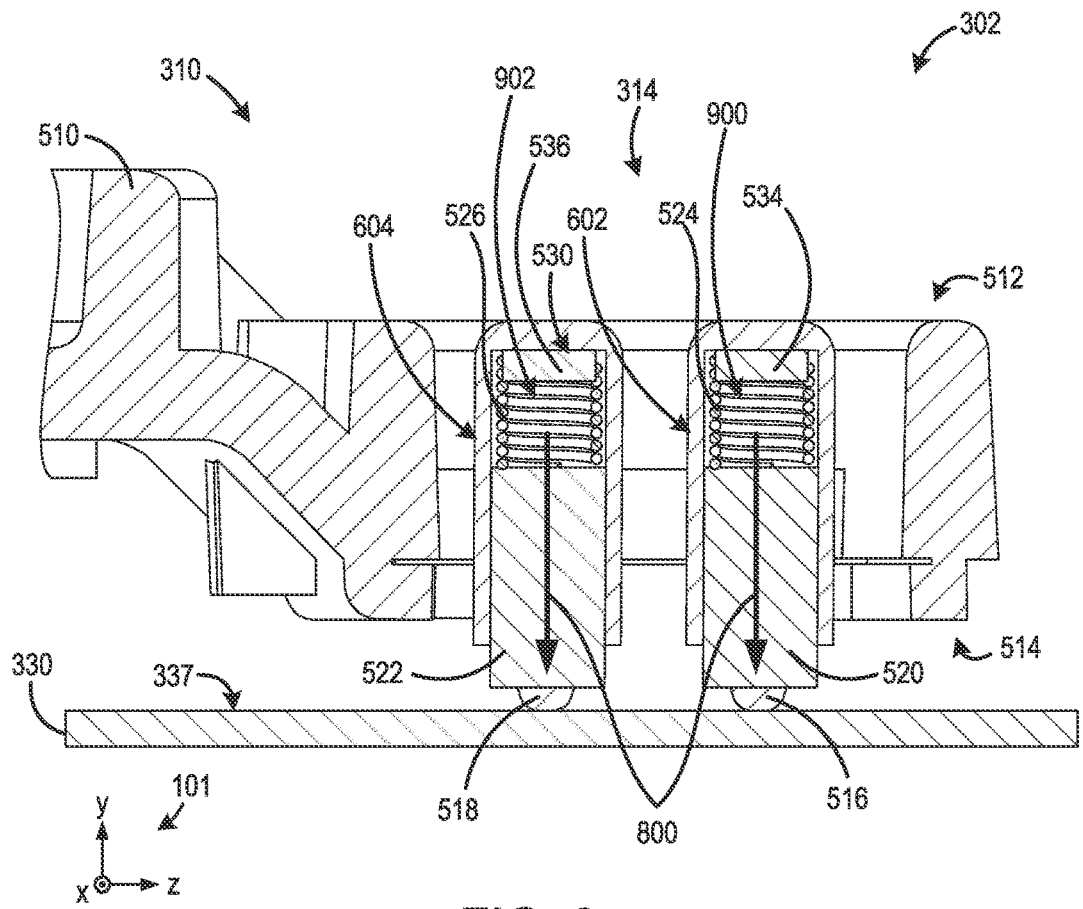
Figure 10:
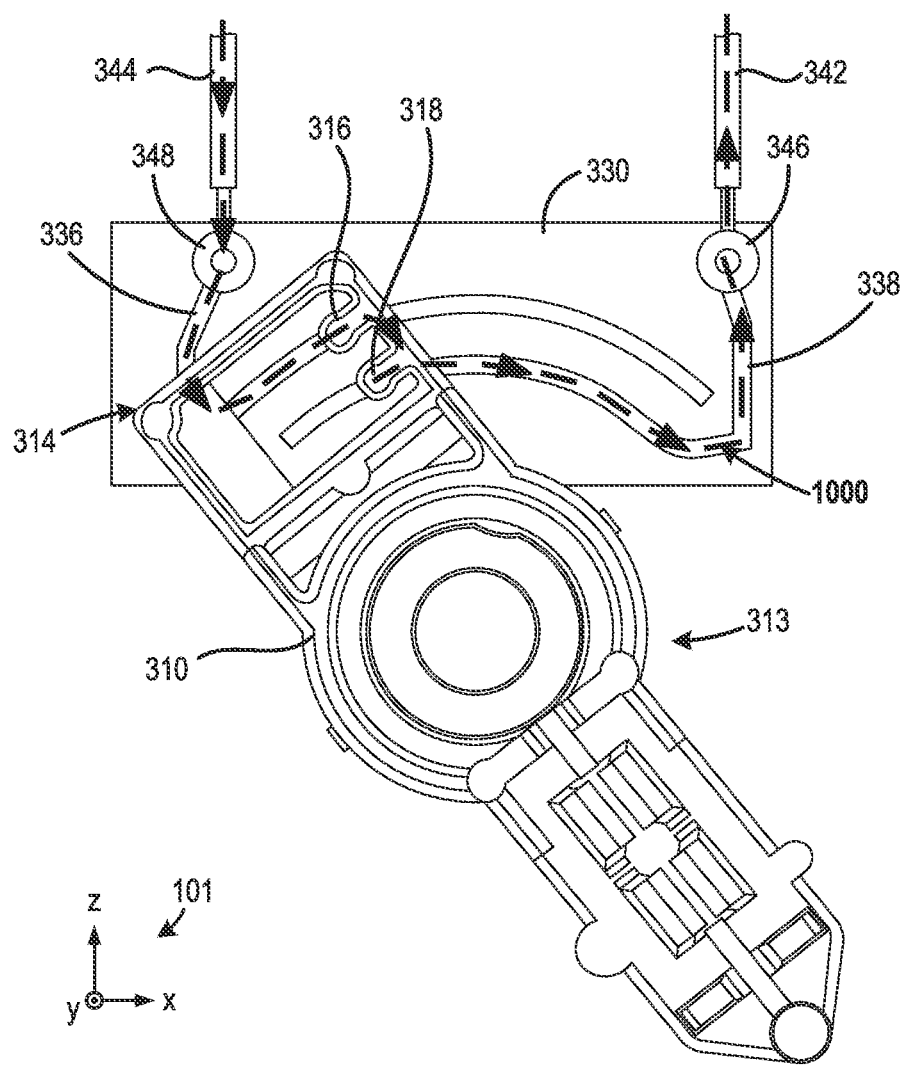
FIG. 10 illustrates a current flow established between the conductive track contacts and the conductive ink tracks on the card, during the first operational state.
Figure 11:
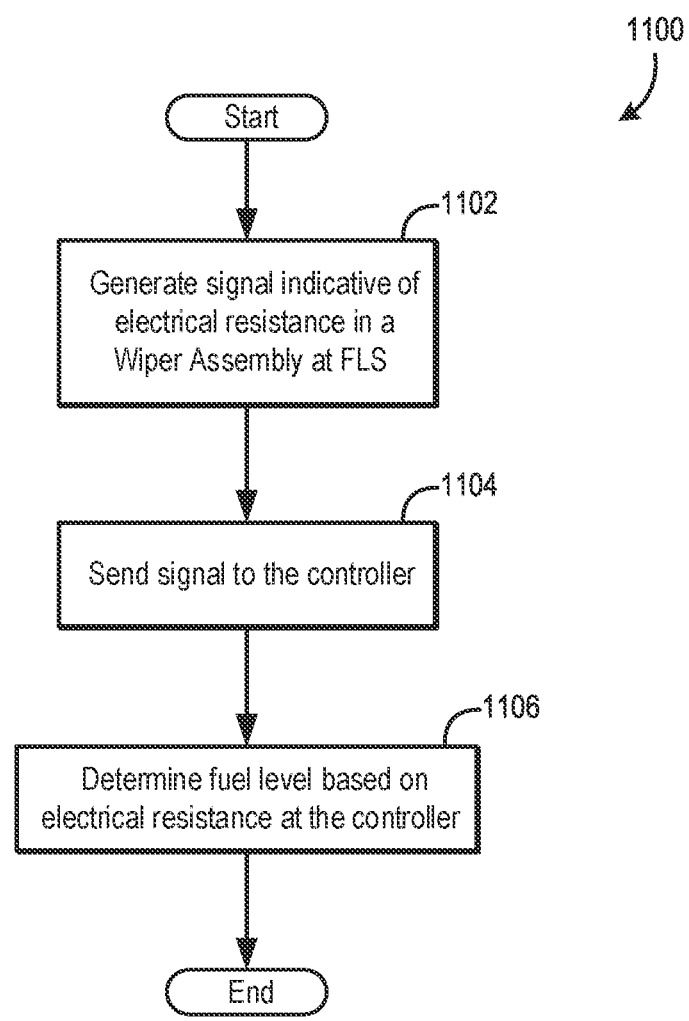
FIG. 11 is a flow chart depicting a method for operating a fuel delivery system.

FIG. 1 is a block diagram of a vehicle system with a fuel system. FIG. 2 schematically depicts a vehicle system, similar to the vehicle system shown in FIG. 1, with a fuel delivery system and an FLS assembly incorporated therein. FIGS. 3A-3B and 4A-4B shows a fuel delivery system with an FLS assembly having a wiper assembly in first and second operational states, respectively, according to one example. FIG. 5 shows an exploded view of the FLS assembly including the wiper assembly. FIG. 6 shows an exploded view of the wiper assembly of the FLS assembly shown in FIG. 5. FIGS. 7A-7F depict different views of the assembled wiper assembly, with FIGS. 7E-7F illustrating cross-sections thereof. FIGS. 8-9 illustrate the wiper assembly with conductive contacts thereof in spring-loaded contact with conductive ink tracks on a card of the FLS assembly. FIG. 10 shows a current flow along the card of the FLS assembly during operation. FIG. 11 shows a flow chart depicting a method for operating a fuel delivery system to determine a fuel level in a fuel tank.

FIG. 1 illustrates a block diagram of an example vehicle propulsion system 100 with a fuel delivery system 140. The vehicle propulsion system 100 may include a fuel burning engine 110 and a motor 120. As a non-limiting example, the engine 110 may be an internal combustion engine (e.g., a spark and/or compression ignition engine) and the motor 120 may be an electric motor (e.g., an electric motor-generator). The motor 120 may be configured to utilize or consume a different energy source than engine 110. For example, the engine 110 may consume a liquid fuel (e.g., gasoline, alcohol, diesel, bio-diesel, combinations thereof, and the like) to produce an engine output, while the motor 120 may consume electrical energy to produce a motor output. As such, a vehicle with propulsion system 100 may be referred to as a hybrid electric vehicle (HEV). Alternatively, the vehicle may be an internal combustion engine vehicle that derives propulsion energy solely from fuel combustion, when the motor 120 is omitted from the propulsion system. In such instances, energy storage device 150, motor 120, and generator 160 may be omitted.

The vehicle propulsion system 100 may utilize a variety of different operational modes depending on operating conditions encountered by the vehicle propulsion system. Some of these modes may enable the engine 110 to be maintained in an off state (e.g., a deactivated state) where combustion of fuel at the engine is discontinued. For example, under select operating conditions, the motor 120 may propel the vehicle via a drive wheel 130, as indicated by arrow 122, while the engine 110 is deactivated.

During other operating conditions, the engine 110 may be set to a deactivated state (as described above) while the motor 120 may be operated to charge an energy storage device 150. For example, the motor 120 may receive wheel torque from the drive wheel 130, as indicated by arrow 122, where the motor may convert the kinetic energy of the vehicle to electrical energy for storage at energy storage device 150, as indicated by arrow 124. This operation may be referred to as regenerative braking of the vehicle. Thus, the motor 120 may provide a generator function in some embodiments. However, in other embodiments, a generator 160 may instead receive wheel torque from drive wheel 130, where the generator may convert the kinetic energy of the vehicle to electrical energy for storage at energy storage device 150, as indicated by arrow 162.

During still other operating conditions, the engine 110 may be operated by combusting fuel received from a fuel delivery system 140, as indicated by arrow 142. For example, the engine 110 may be operated to propel the vehicle via the drive wheel 130, as indicated by arrow 112, while the motor 120 is deactivated. During other operating conditions, both the engine 110 and the motor 120 may each be operated to propel the vehicle via the drive wheel 130, as indicated by arrows 112 and 122, respectively. A configuration where both the engine and the motor may selectively propel the vehicle may be referred to as a parallel type vehicle propulsion system. Note that in some embodiments, the motor 120 may propel the vehicle via a first set of drive wheels and the engine 110 may propel the vehicle via a second set of drive wheels.

In other embodiments, vehicle propulsion system 100 may be configured as a series type vehicle propulsion system, where the engine 110 does not directly propel the drive wheels. Rather, the engine 110 may be operated to provide power to the motor 120, which may in turn propel the vehicle via the drive wheel 130, as indicated by arrow 122. For example, during select operating conditions, the engine 110 may drive the generator 160, as indicated by arrow 116, which may in turn supply electrical energy to one or more of the motor 120, as indicated by arrow 114, or the energy storage device 150, as indicated by arrow 162. As another example, the engine 110 may be operated to drive the motor 120, which may in turn provide a generator function to convert the engine output to electrical energy, where the electrical energy may be stored at the energy storage device 150 for later use by the motor.

Fuel delivery system 140 may include one or more fuel storage tanks for storing the liquid fuel consumed by the engine (e.g., gasoline, diesel, bio-diesel, alcohol (e.g., ethanol, methanol, and the like), combinations thereof, etc.) on-board the vehicle and a fuel pump for supplying the fuel(s) to the engine 110, where they may be combusted at the engine to produce an engine output. The engine output may then be utilized to propel the vehicle as indicated by arrow 112 or to recharge the energy storage device 150 via the motor 120 or the generator 160. As will be elaborated on herein with regard to FIGS. 2-10, the fuel delivery system 140 may include an FLS assembly for measuring a level of fuel within a fuel tank.

In some embodiments, the energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

A control system 190 may communicate with one or more of the engine 110, motor 120, fuel delivery system 140, energy storage device 150, and generator 160. Control system 190 may receive sensory feedback information from one or more of engine 110, motor 120, fuel delivery system 140, energy storage device 150, and generator 160. Further, control system 190 may send control signals to one or more of engine 110, motor 120, fuel delivery system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

In one example, the control system 190 may be in communication with a fuel gauge 195 for indicating a fuel level in a fuel tank of the fuel delivery system 140. As such, the control system 190 and/or the fuel gauge 195 may receive a signal from an FLS of the fuel delivery system 140 that is indicative of the fuel level. Further, the control system 190 may include a Powertrain Control Module (PCM) and/or an Instrument Panel (IP) that are programmed to determine the fuel level based on the signal received from the FLS and, in some cases, for communicating the fuel level information to the fuel gauge. The fuel gauge may be a mechanical gauge indicating the fuel level or, in some cases, may take the form of a graphical user interface (GUI) or other type of digital display. Further, in some examples, the fuel gauge may include audio, visual, and/or haptic indicators for communicating a fuel level or a change in the fuel level to a vehicle operator. Exemplary FLS assembly configurations are elaborated on herein, particularly with reference to FIGS. 3A-10.

In some examples, the energy storage device 150 may periodically receive electrical energy from a power source 180 that resides external to the vehicle (e.g., not part of the vehicle), as indicated by arrow 184. As a non-limiting example, the vehicle propulsion system 100 may thus be configured as a plug-in hybrid electric vehicle (PHEV), whereby electrical energy may be supplied to the energy storage device 150 from the power source 180 via an electrical energy transmission cable 182. During a recharging operation of the energy storage device 150 from the power source 180, electrical energy transmission cable 182 may electrically couple the energy storage device 150 and power source 180. While the vehicle propulsion system is operated to propel the vehicle, the electrical energy transmission cable 182 may be disconnected between the power source 180 and the energy storage device 150. In some cases, the control system 190 may identify and/or control the amount of electrical energy stored at the energy storage device, which may be referred to as the state of charge (SOC).

In other embodiments, the electrical energy transmission cable 182 may be omitted, where electrical energy may be received wirelessly at the energy storage device 150 from the power source 180. For example, the energy storage device 150 may receive electrical energy from the power source 180 via one or more of electromagnetic induction, radio waves, and electromagnetic resonance. As such, it should be appreciated that any suitable approach may be used for recharging the energy storage device 150 from a power source that does not comprise part of the vehicle, such as from solar or wind energy. In this way, the motor 120 may propel the vehicle by utilizing an energy source other than the fuel utilized by engine 110, in some examples. In other examples, however, the vehicle propulsion system 100 may be configured as a full hybrid electric vehicle (FHEV), using the engine 110 to recharge the energy storage device 150 during certain driving operations (e.g., during regenerative braking).

The fuel delivery system 140 may periodically receive fuel from a fuel source residing external to the vehicle. As a non-limiting example, the vehicle propulsion system 100 may be refueled by receiving fuel via a fuel dispensing device 170, as indicated by arrow 172. In some embodiments, a fuel tank may be configured to store the fuel received from the fuel dispensing device 170 until it is supplied to the engine 110 for combustion.

An axis system 101 is provided in FIG. 1, as well as FIGS. 2-5 and 8-10, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Referring to FIG. 2, a schematic depiction of a vehicle system 200 is shown. In some examples, the vehicle system 200 may be an HEV system, such as a PHEV system. For example, the vehicle system 200 may be similar to the vehicle propulsion system 100 of FIG. 1. However, in other examples, the vehicle system 200 may be implemented in a non-hybrid vehicle (e.g., a vehicle equipped with an engine and without a motor operable to at least partially propel the vehicle).

The vehicle system 200 may derive propulsion power from an engine system 210 and/or an on-board energy storage device 250, such as a battery. An energy conversion device, such as electric motor-generator 220, may be operated to absorb energy from vehicle motion and/or engine operation and then convert the absorbed energy to an energy form suitable for storage by the energy storage device. For example, the electric motor-generator 220 may receive electrical power from the energy storage device 250 to provide torque to the vehicle drive wheels 230. The electric motor-generator 220 may also be operated as a generator to provide electrical power to charge the energy storage device 250 during, for instance, a braking operation.

The engine system 210 may include an engine 211 having a plurality of cylinders 212. The engine 210 may include an engine intake 213 and an engine exhaust 214. Further, the engine intake 213 may include an air intake throttle 215 fluidly coupled to the engine intake manifold 216 via an intake passage 217. Air may enter the intake passage 217 via an air filter 218. The engine exhaust 214 may include an exhaust manifold 221 leading to an exhaust passage 222 that routes exhaust gas to the atmosphere. The engine exhaust 214 may further include one or more emission control devices 223 mounted in a close-coupled position. The one or more emission control devices may include a three-way catalyst, lean NOx trap, diesel particulate filter, oxidation catalyst, etc. It will be appreciated that other components may be included in the engine, such as a variety of valves and sensors. In embodiments where the engine system is a boosted engine system, the engine system may further include a boosting device, such as a turbocharger.

The engine system 210 may be coupled to a fuel delivery system 240. In one example, the fuel delivery system 240 may include a fuel delivery module 242 operably coupled to a fuel tank 244. During a fuel tank refueling event, fuel may be pumped into the fuel tank 244 of the vehicle from an external source (e.g., fuel dispensing device 170 of FIG. 1) through a refueling assembly 245, which is in fluidic communication with the fuel tank 244. The fuel tank 244 may hold a plurality of fuels and/or fuel blends, including fuel with a range of alcohol concentrations, such as various gasoline-ethanol blends, including E10, E85 as well as gasoline, diesel, bio-diesel, etc.

The fuel delivery module 242 may include a fuel pump 246 in communication with the fuel tank 244 and an FLS 248 at least partially disposed within the fuel tank 244. The fuel pump 246 may be configured to pressurize fuel delivered to the injectors of engine 211, such as a fuel injector 249. While a single fuel injector 249 is shown, additional injectors may be provided for each of the cylinders 212. It will be appreciated that the fuel delivery system 240 may be a return-less fuel system, a return fuel system, or various other types of fuel systems. Further, in some examples, the FLS 248 may be configured to provide an indication of a fuel level to a control system 290. The structural and functional details of an example FLS 248 will be described with reference to FIGS. 3A-10.

The control system 290 of the vehicle system 200 may further include a controller 291. The controller 291 may include a processor 292 and a memory 294. The memory may hold instructions stored therein that when executed by the processor cause the controller to perform various methods, control techniques, and the like described herein. The processor 292 may include a microprocessor unit and/or other types of circuits. The memory 294 may include known data storage mediums, such as random access memory, read only memory, keep alive memory, combinations thereof, and the like. The controller 291 may receive various signals from sensors 296 positioned in different locations in the vehicle system 200, such as the FLS 248 in the fuel delivery system 240, as will be elaborated on herein. The controller 291 may also send control signals to various actuators 298 coupled at different locations in the vehicle system 200. In some examples, the controller 291 may be configured as a PCM or an IP. Further, the controller 291 may be capable of receiving information from the FLS 248 and, based on said information, determining a fuel level within the fuel tank 244. The control system may then communicate the fuel level to a vehicle operator via a display or user interface (e.g., fuel gauge 195 in FIG. 1).

In some examples, the vehicle system 200 may be a hybrid vehicle with multiple sources of torque available to one or more vehicle drive wheels 230, as previously discussed with regard to the vehicle propulsion system 100 of FIG. 1. As such, the vehicle system 200 may utilize the engine 211 and/or electric motor-generator 220, during various operating conditions, to provide power to the drive wheels 230 via a transmission 235. In some examples, an output of the engine 211 (schematically depicted by line 251) and the electric motor-generator 220 may be connected, via the transmission 235, to the drive wheels 230 when one or more clutches 252 are engaged. For instance, a first clutch 252 may be provided between the engine output 251 and the electric motor-generator 220, and a second clutch 252 may be provided between the electric motor-generator 220 and the transmission 235. The controller 291 may send a signal to an actuator of each clutch 252 to engage or disengage the clutch, so as to connect or disconnect the engine output 251 from the electric motor-generator 220 and the components connected thereto, and/or connect or disconnect the electric motor-generator from the transmission 235 and the components connected thereto. The transmission 235 may be a gearbox, a planetary gear system, or another type of transmission. Further, the vehicle system 200 may be configured in various manners including as a parallel, a series, or a series-parallel hybrid vehicle, in different examples.

Figure 3A:
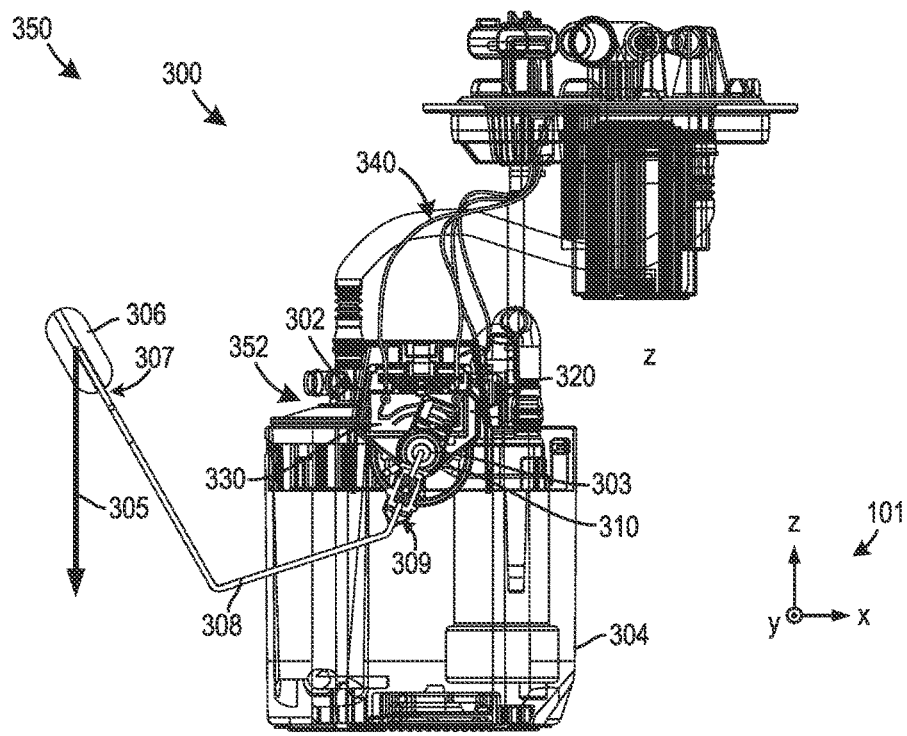
FIGS. 3A-3B show an example fuel level sensor (FLS), particularly illustrating an FLS wiper assembly in a first operational state.

Turning to FIG. 3A, a fuel delivery module 300 with an FLS 302 coupled to a fuel pump housing 304 is shown. The fuel delivery module 300 and FLS 302 may be included in a fuel delivery system 350 that may share similarities with the fuel delivery system 240 in the vehicle system 200 of FIG. 2 and/or the fuel delivery system 140 shown in FIG. 1. For instance, the fuel delivery module 300 may include a fuel pump 352 (e.g., a lift pump). In other examples, however, the FLS 302 may be designed as a fluid level sensor for detecting a liquid level in other types of fuel tanks or liquid storage vessels, and may therefore be implemented in an operating environment other than a vehicle system.

The FLS 302 may include a float 306 disposed for vertical movement, in a direction generally along the z-axis, in a fuel tank (e.g., the fuel tank 244 of FIG. 2). The float 306 may be buoyant with regard to the liquid fuel stored in the fuel tank. Further, a float arm 308 may be a coupled at distal end 307 thereof to the float 306 for movement therewith. A proximal (or upper) end 309 of the float arm 308 may be operably connected to an FLS wiper assembly 310, which is mounted for rotation relative to an FLS frame 320 coupled to the fuel pump housing 304.

In one example, the proximal end 309 of the float arm 308 may be engaged with a bearing 303 disposed in the middle portion 313 of the wiper assembly 310. Further, in some cases, the bearing 303 may be a bushing which allows rotation of the wiper assembly 310 and the float arm 308 with respect to the FLS frame 320 (e.g., about rotational axis 650 illustrated in FIG. 6) as the float 306 moves up or down according to the fuel level within the fuel tank. However, in alternate examples, the bearing 303 may be constructed as a ball or roller bearing. For instance, in one example, the bearing 303 in the middle portion 313 of the wiper assembly may be designed to align with a corresponding central cylindrical portion 301 of the FLS frame 320, as depicted in FIG. 5, to provide a coupling between the wiper assembly and FLS frame while allowing for rotation of the wiper assembly relative to the frame.

In one example, the FLS 302 may include a wiring harness 340 for supplying current through the FLS assembly, forming a circuit with the card 330 and the wiper assembly 310. Further, the FLS 302 may be designed to provide a signal, obtained via the wiring harness 340, which is indicative of an electrical resistance experienced across a card 330. The structure and functional arrangement of the FLS components, particularly that of the wiper assembly 310, the frame 320, and the card 330, are further described with reference to FIGS. 3B-10.

Figure 3B:
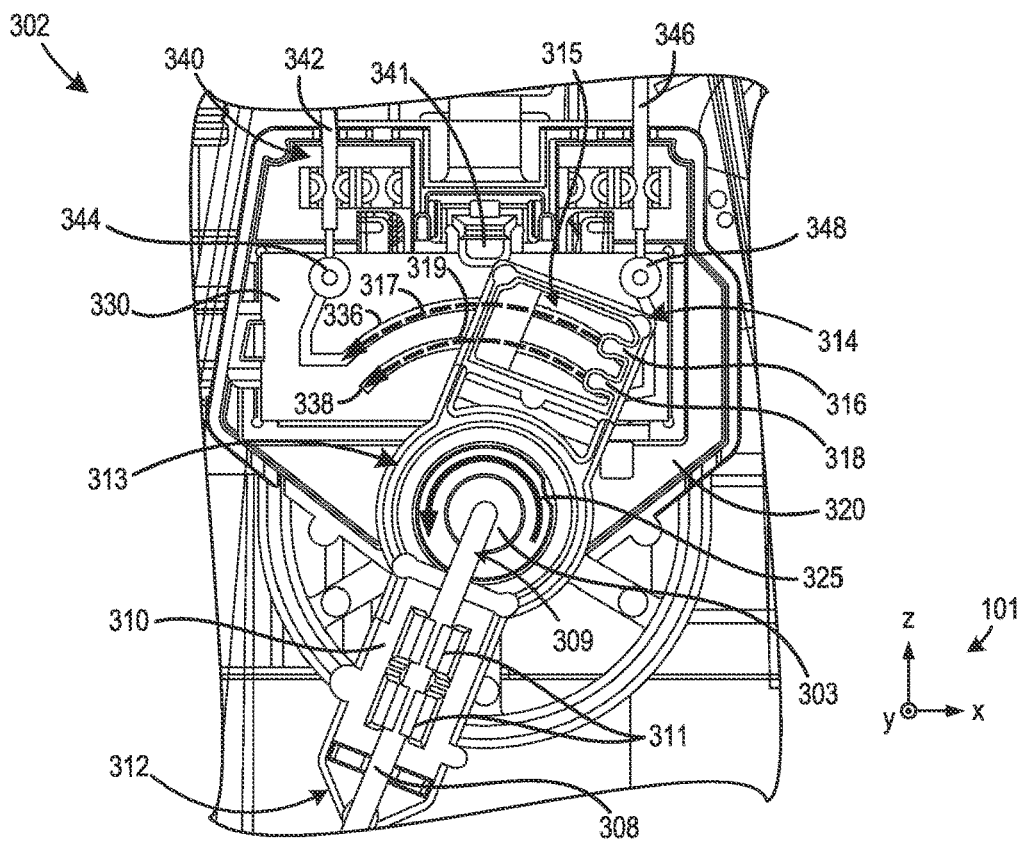

Turning to FIG. 3B, the FLS 302 is shown in greater detail, with the wiper assembly 310 in the first operational state. As illustrated, the wiper assembly 310 may include a lower portion 312 and an upper portion 314, with a middle portion 313 disposed therebetween. The proximal end 309 of the float arm 308 may be coupled to the wiper assembly 310 at the lower portion 312. In some examples, clips 311 integrated into the lower portion 312 of the wiper assembly may be used to secure the float arm thereto, though other fastening arrangements have been envisioned, in other examples. Further, the proximal end 309 of the float arm may extend along the lower portion 312 of the wiper assembly 310, terminating at the middle portion 313, so that the wiper assembly 310 rotates with the float arm 308 in accordance with vertical movement of the float 306.

In some examples, the upper portion 314 of the wiper assembly 310 may include a window 315 formed therein with two contact portions 316, 318 that protrude into the window 315. The contact portions 316, 318 include conductive contacts, as will be further described in relation to FIGS. 5-10, which may be biased in direct spring-loaded contact against the card 330. To elaborate, the card 330 may be formed as a ceramic substrate, in some examples, and may include at least two conductive ink tracks 336, 338, which may be printed on a front side 337 thereof. In some examples, the conductive ink composition may include a combination of silver (Ag) and palladium (Pd), though other conductive ink compositions have been contemplated. Further, the card 330 may be held in place against the FLS frame 320 (e.g., within a cavity 321, illustrated in FIG. 5, formed within an upper portion of the frame 320) by one or more clips 341 integrally formed on the FLS frame 320, in some examples. Further, in some examples, the card 330 may be sized and shaped so as to fit within a cavity 321 formed in an upper portion of the FLS frame 320. In other examples, other fastening arrangements for securing the card 330 to the FLS frame 320 may be utilized in addition or as an alternative to the clips 341, such as, for instance, screws and/or adhesives.

As illustrated in FIG. 3B, the conductive ink tracks 336, 338 may be spaced apart from each other a distance substantially the same as a distance between the contact portions 316, 318 of the wiper assembly 310. Further, a portion of each of the conductive ink tracks 336, 338 may have an arcuate shape corresponding to an arcuate path of travel 317, 319 of the contact portions 316, 318, respectively. Even further, the wiring harness 340 may be coupled to the conductive ink tracks 336, 338 in order to supply a flow of current through the card 330 and the contact portions 316, 318. To elaborate, a first wire 342 of the wiring harness 340 may be electrically coupled to the conductive ink track 336 at a first terminal 344 on the card 330, and a second wire 346 of the wiring harness may be electrically coupled to the conductive ink track 338 at a second terminal 348 on the card 330.

In one example, the first terminal 344 may be a positive terminal and the second terminal 348 may be a negative terminal. A resultant current flow according to this example is shown in FIG. 10, as indicated by current flow path 1000. In such an example, the first terminal 344 may receive current via the first wire 342, such that a flow of current passes along the conductive ink track 336 to the contact portion 316 in in the wiper assembly 310. From there, the current may flow to the conductive ink track 338 via the contact portion 318 and then to the second terminal 348. The current may then flow through the second wire 346 of the wiring harness 340. Further, an electrical resistance may be determined between the first and second terminals 344, 348 of the FLS 302 based upon the position of the contact portions 316, 318 along the arcuate paths 317, 319, respectively. In other examples, the second terminal 348 may be the positive terminal, with the first terminal 344 the negative terminal, such that a flow of current moves through the FLS 302 in a direction opposite the current flow 1000 shown in FIG. 10.

Returning to FIGS. 3A-3B, the movement of the float arm 308 (as the float 306 moves up and down with respect to changing fuel levels) causes the wiper assembly 310 to pivot about its middle portion 313 with respect to the FLS frame 320, where the differing position of the wiper assembly 310 varies the electrical resistance established by the contact portions 316, 318 of the wiper assembly along the conductive ink tracks 336, 338. As previously discussed, the FLS 302 may then transmit a signal indicative of said electrical resistance to a controller (e.g., of control system 190 or 290 of FIG. 1 or 2, respectively), which may then determine a level of fuel in the fuel tank based on the electrical resistance.

For example, FIGS. 3A-3B illustrate the FLS 302 in a first operational state, with the float 306 at a higher position, which may represent a full or substantially full fuel tank, in some cases. From this position, as the fuel level decreases, the float 306 will move downward in the direction of arrow 305, as depicted in FIG. 3A. The float arm 308 will then cause the wiper assembly 310 to rotate in a counterclockwise direction, in the frame of reference of FIG. 3A-3B, in the direction of arrow 325 depicted in FIG. 3B. Accordingly, the contact portions 316, 318 in the upper portion 314 of the wiper assembly will move along conductive ink tracks 336, 338 in the direction of arrows indicated on arcuate travel paths 317, 319, respectively, where the electrical resistance varies according to the movement.

Figure 4A:
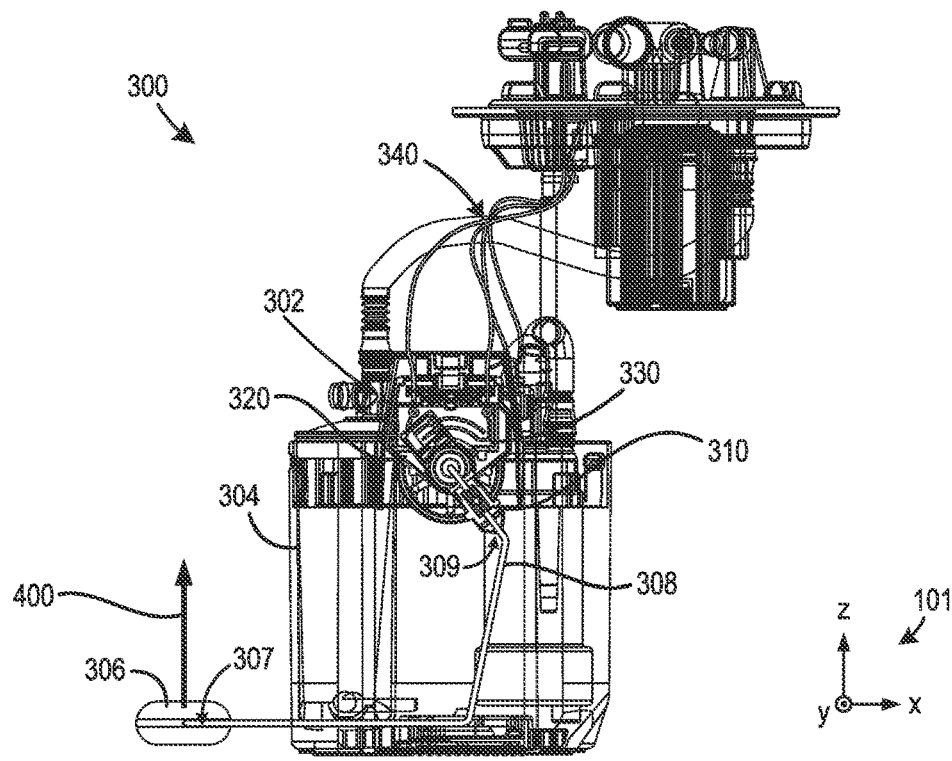
FIGS. 4A-4B show the example FLS depicted in FIGS. 3A-3B, with the FLS wiper assembly in a second operational state.
Figure 4B:
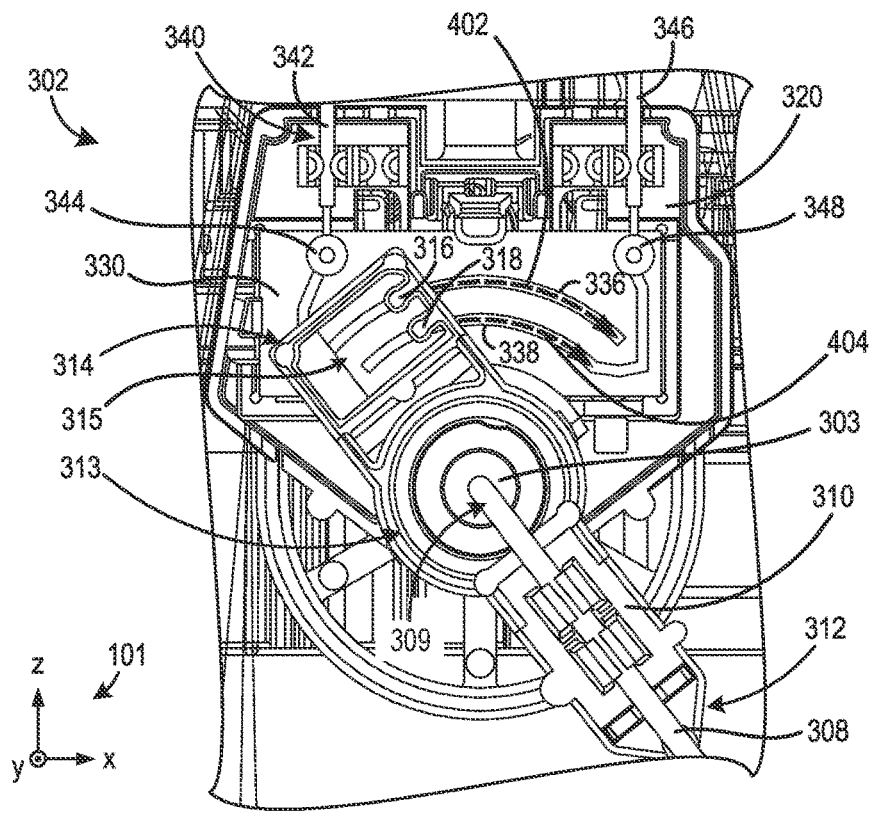

FIGS. 4A-4B illustrate the FLS 302 in a second operational state, where the fuel level has dropped and the float 306 has moved downward (in the direction of arrow 305 in FIG. 3A) into a lower position indicative of a lower fuel level. Consequently, the wiper assembly 310 may rotate in a counterclockwise direction, in the frame of reference of FIGS. 3A-4B, thereby altering the electrical resistance experienced along the current flow path between wires 342, 346 of the wiring harness 340. In response to an increasing fuel level, resultant movement of the float 306 in the direction of arrow 400 (depicted in FIG. 4A) will cause the wiper assembly 310 to rotate in a clockwise direction, in the frame of reference of FIGS. 3A-4B, so that the contact portions 316, 318 in the upper portion 314 of the wiper assembly move along the conductive ink tracks 336, 338 in the direction of arrows 402, 404, respectively.

Further, the wiper assembly 310 may be designed such that the contact portions 316, 318 enable adequate and more consistent contact along the travel path during any operational states. Thus, the FLS 302 can reliably detect an electrical resistance which corresponds to the position of the wiper assembly and a fuel level. The structural details of the wiper assembly 310, and particularly of the contact portions 316, 318, will be elaborated on with reference to FIGS. 5-9.

The structural details of the conductive contact portions of the FLS wiper assembly 310 are described with reference to FIGS. 5-7F. FIG. 5 shows an exploded view of the FLS 302, as illustrated in FIGS. 3A-4B, particularly illustrating individual components of the contact portions 316, 318 in the FLS wiper assembly 310, while FIGS. 6-7F specifically depict the wiper assembly and components thereof. Another axis system 600 is provided in FIGS. 6-7F, for reference. The axis system 600 includes again includes an x-axis, a y-axis, and a z-axis. These axes are aligned with dimensions of the wiper assembly 310. As such, with regard to the wiper assembly, the x-axis may be its longitudinal axis, the z-axis may be its lateral axis, and the y-axis may be its vertical axis.

However, during operating of the FLS, the wiper assembly rotates in response to fuel level changes and the wiper assembly's position in relation to a gravitational axis therefore changes.

In one example, with reference to FIG. 5, the FLS wiper assembly 310 may include a wiper housing 510 that includes the bearing 303 positioned at the middle portion 313 of the wiper assembly 310. The bearing 303 couples the wiper housing 510 for relative rotation with the FLS frame 320 at the central cylindrical portion 301 thereof. Further, the float arm 308 may be coupled to the wiper housing 510 on an outer side 512 of the wiper housing, coupled thereto at the lower portion 312 and/or the middle portion 313 of the wiper assembly. Even further, the contact portions 316, 318 of the wiper assembly 310 may be generally disposed on an inner side 514 of the wiper housing 510, between the wiper housing 510 and the card 330. As previously discussed, the card 330 includes conductive ink tracks 336, 338 and may be fixed within a cavity 321 of the FLS frame 320. The wires 342, 346 are electrically connected to the conductive ink tracks 336, 338 via terminals 344, 348, respectively.

The contact portions 316, 318 may include conductive track contacts 516, 518. The contacts 516, 518 may each have a distal end 515 which faces the card 330, and a proximal end 517 opposite the distal end. In one example, the track contacts 516, 518 may be formed of a conductive material such as gold. In other examples, however, additional or alternative conductive materials may be used, such as, for instance, copper, silver, or other metals having a conductivity adequate for completing a circuit upon contact with the conductive ink tracks 336, 338 on the card 330.

In order to urge the conductive track contacts 516, 518 into contact with the conductive ink tracks 336, 338, respectively, a spring loading arrangement is provided on the proximal side of the conductive track contacts. In one example, a pair of cylindrical springs 524, 526 are disposed on the proximal end 517 of the conductive track contacts 516, 518, respectively. Further, a pair of conductive spacers 520, 522 may be positioned between the respective cylindrical springs and track contacts. To elaborate, distal ends 521 of the spacers 520, 522 may abut the proximal end 517 of the conductive track contacts 516, 518, respectively, while proximal ends 523 of the spacers 520, 522 may contact the cylindrical springs 524, 526, respectively. The cylindrical springs 524, 526 are specifically illustrated as coil spring. However, alternate types of springs may be used in other embodiments, such as a stack of wave springs, for instance.

Further, the cylindrical springs 524, 526 may be positioned between the conductive spacers 520, 522 and a conductive internal plate 530. The conductive internal plate 530 may include protrusions 534, 536, that when assembled, contact the cylindrical springs 524, 526, respectively, when the contact portions 316, 318 are assembled within the wiper housing 510. Thus, the protrusions 534, 536 may be referred to as spring contacting protrusions. Even further, the conductive internal plate 530 may include a body 532 that joins and extends between the protrusions 534, 536.

In some examples, each of the conductive spacers 520, 522, cylindrical springs 524, 526, and conductive internal plate 530 may be formed from a conductive material (e.g., a conductive metal such as copper, gold, aluminum, stainless steel, combinations thereof, and the like).

FIG. 6 again depicts an exploded view of the wiper assembly 310, particularly illustrating a view of the inner side 514 thereof (which faces the FLS frame 320 and card 330, as depicted in FIG. 5), as well as the rotational axis 650 about which the wiper housing 510 of the FLS wiper assembly may rotate. Repeated discussion of the arrangement of the cylindrical springs 524, 526, conductive spacers 520, 522, and conductive track contacts 516, 518 with respect to the conductive internal plate 530 is omitted for brevity.

As illustrated in FIG. 6, the wiper housing 510 may include two openings 602, 604, each formed as a hollow cylinder having a bore 606, 608, respectively. The openings 602, 604 may house the springs and guide the springs 524, 526 through their travel, thereby reducing the chance of undesired spring degradation (e.g., deformation). Further, the openings 602, 604 may protrude into the window 315 at the upper portion 314 of the wiper assembly. Even further, particularly with reference to FIGS. 7A-9, the contact portions 316, 318 of the wiper assembly 310 may include the aforementioned components assembled within the wiper housing 510 at the upper portion 314 thereof.

FIGS. 7A-7F depict the FLS wiper assembly 310 in an assembled configuration. The sections of the wiper assembly illustrated in FIGS. 7B and 7E are taken from the dashed boxes shown in FIGS. 7A and 7D, respectively. The cross-sectional views of the wiper assembly shown in FIGS. 7C and 7F are defined by lateral cuts taken along dashed lines 7C-7C and 7F-7F, respectively.

In some examples, the conductive internal plate 530 may be over-molded within the wiper housing 510, at the upper portion 314 of the wiper assembly 310, for instance. Over-molding the conductive plate into the housing decreases the chance of plate degradation that may occur during assembly or operation of the FLS. The body 532 of the conductive internal plate 530 may be over-molded within a region of the housing, as depicted by the dashed outline of region 700 in FIG. 7F. Further, the protrusions 534, 536 of the conductive internal plate 530, extending from the over-molded region 700 of body 532, may be arranged within the openings 602, 604, respectively. More specifically, the protrusions 534, 536 may be positioned adjacent a respective base 612, 614 of the corresponding openings 602, 604. In other words, cut-outs are formed in the hollow cylindrical openings 602, 604 which receive and expose the protrusions 534, 536 within the bores 606, 608, respectively. As such, the protrusions 534, 536 of the conductive internal plate 530 are located at corresponding bases 612, 614 of the bores 606, 608, respectively, proximate the outer side 512 of the wiper housing 510.

The cylindrical springs 524, 526 are next positioned within the bores 606, 608, respectively, abutting and/or partially surrounding the protrusions 534, 536, respectively. Further, the conductive spacers 520, 522 may be inserted into the bores 606, 608 of the openings 602, 604, respectively, following the placement of the cylindrical springs. As particularly illustrated in FIGS. 7C and 7F, the openings 602, 604 in the wiper housing 510 may at least partially circumferentially enclose each of the protrusions 534, 536, the springs 524, 526, and the conductive spacers 520, 522. Further, in some examples, the spacers 520, 522 may partially extend outwardly from the openings 602, 604, respectively, on the inner side 514 of the wiper housing 510, as shown in FIG. 7C. The conductive track contacts 516, 518 may be coupled to an end of the conductive spacers 520, 522 that is outside of the openings 602, 604, respectively.

By arranging the components of the wiper assembly 310 in the aforementioned manner, the FLS wiper assembly 310 may be easily and efficiently assembled, with a reduced chance of degradation due to undesired handling of the components during assembly. For instance, with the conductive internal plate over-molded within the wiper housing 510, such that the protrusions 534, 536 are positioned at the bases 612, 614 of the cylindrical openings 602, 604 of the wiper housing, it may be easier to assemble the remaining components of the wiper assembly 310. Further, the springs 524, 526 may be inserted within the bores 606, 608 so as to surround and/or bound the protrusions 534, 536, respectively. Even further, the cylindrical springs 524, 526 may be in a compressed spring when installed in the FLS wiper assembly 310, the result of which will be understood with reference to FIGS. 8-9. Upon inserting the springs 524, 526 into the bores 606, 608 of the openings 602, 604, the conductive spacers 520, 522 and conductive track contacts 516, 518 may be accordingly joined with the FLS wiper assembly 310. In this way, even in the case of an operator mishandling the components during assembly, the functionality of the FLS wiper assembly 310 in the FLS 302 may not be affected.

FIGS. 8-9 depict the FLS 302 with the conductive track contacts 516, 518 in contact with conductive ink tracks 336, 338 on the card 330, as previously described. In the illustrated arrangement, the cylindrical springs 524, 526 positioned within the openings 602, 604, respectively, of the wiper housing 510 bias the conductive spacers 520, 522, respectively, towards the card 330, as indicated by arrows 800. Thus, the conductive track contacts 516, 518 coupled to the conductive spacers 520, 522, respectively, may also be biased in the direction of arrows 800 towards the card. In this way, the wiper assembly may provide a reliable spring force urging the conductive contact points (of the conductive track contacts) into contact with the conductive ink tracks on the resistive card, thereby reliably allowing the passage of electricity therethrough. At least a portion of the protrusions 534, 536 of the conductive internal plate 530 may extend into interior orifices 900, 902, of the respective springs 524, 526 and contacts the spring coils. In this way, robust contact may be formed between the conductive plate and the springs. However, other arrangements between the conductive plate and the springs may be used, in other embodiments.

By maintaining contact between the conductive track contacts 516, 518 and the conductive ink tracks on the card, the FLS 302 may reliably measure an electrical resistance along the card throughout movement of the wiper assembly 310. Consequently, the accuracy of the fuel level reading from the FLS may be more accurate, thereby increasing customer satisfaction. Further, by spring-loading the conductive track contacts of the wiper assembly, the FLS may provide reliable readings based on said spring-loaded contact with the resistive card. Even further, the overall arrangement of the FLS may help to reduce the chance of potential degradation of components during assembly and/or manufacturing, as the components may be easily aligned and inserted within respective parts without permanent deformation of the components, which may degrade the FLS detection capabilities, thereby providing a more robust and reliable FLS assembly and increasing customer satisfaction.

A method 1100 for an FLS in a fuel delivery system is shown in FIG. 11. The method 1100 may be carried out in a fuel delivery system of a vehicle, such as the fuel delivery system 140 of FIG. 1 or the fuel delivery system 240 of FIG. 2. However, in other examples, the method 1100 may be implemented in other fuel systems or environments where it is desired to determine a liquid (e.g., fuel) level within a storage vessel. Instructions for carrying out method 1100 and the rest of the control techniques described herein may be executed by a controller based on instructions stored on a memory of the controller and in conjunction with signals received from sensors of the fuel system, such as the sensors described above with reference to FIG. 1. The controller may employ actuators of the system to adjust component operation, according to the methods described below.

At 1102, the method includes, at an FLS assembly, generating a signal indicative of electrical resistance in a fuel level wiper assembly. In some examples, the step 1102 may be executed while at least two spring-loaded conductive track contacts of the wiper assembly are in contact with a conductive ink track on a card (e.g., contacts 516, 518 and tracks 336, 338 of the card 330 illustrated in FIGS. 8-9).

At 1104, the method includes sending the signal indicative of electrical resistance to a controller. Next, at 1106, the method includes determining a fuel level based on the electrical resistance at the controller. For instance, look-up tables, or other programmatic constructs, may be used to correlate the detected electrical resistance with an in-tank fuel level. The method may further include adjusting a fuel gauge based on the fuel level determined by the controller. For example, the measured resistance may be matched with the fuel gauge.

The technical effect of the fuel level detection methods described herein is to provide a robust and reliable technique for determining fuel level via an FLS assembly that is structured to maintain contact at the interface of the wiper assembly and the resistive card. By providing an FLS structure which is less prone to operator-induced degradation during manufacturing and assembly, an electrical resistance measured at the FLS may be used to more confidently and reliably determine a fuel level in a fuel tank of a vehicle or other system. Customer satisfaction is consequently increased.

The FLS assembly described herein is capable of reliably urging the conductive track contacts towards a position contacting the conductive ink tracks on the resistive card throughout the range of motion of the wiper assembly during fuel level changes, due to the spring-loaded configuration of the wiper assembly. As such, the integrity and continuity of the circuit established in the FLS is maintained, so that the electrical resistance may be reliably used to determine a fuel level in the fuel tank. Further, the structure of the FLS, and particularly the conductive contact components thereof, may be easily assembled within the wiper assembly of the FLS while preventing potential deformation or otherwise undesirable degradation of components thereof which may lead to FLS malfunctions.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, an FLS wiper assembly is provided that comprises at least two conductive track contacts each designed to contact a conductive ink track on a card; at least two cylindrical springs positioned between the at least two conductive track contacts and a conductive internal plate; and a wiper housing including at least two openings that at least partially enclose the conductive internal plate and the at least two cylindrical springs.

In another aspect, an FLS is provided that comprises a wiper assembly comprising a pair of conductive track contacts each contacting a conductive ink track on a card at their first ends and a pair of conductive spacers at their second ends; a pair of cylindrical springs positioned between a conductive internal plate and first ends of the pair of conductive spacers and biasing the pair of conductive spacers; and a wiper housing including a pair of openings that at least partially enclose the conductive internal plate and the pair of cylindrical springs.

In yet another aspect, a method for a fuel delivery system is provided that comprises, at an FLS assembly, generating a signal indicative of electrical resistance in a fuel level wiper assembly while at least two spring-loaded conductive track contacts of the wiper assembly are each in contact with a conductive ink track, where the wiper assembly includes at least two cylindrical springs positioned between the at least two conductive track contacts and a conductive internal plate, each spring urging a corresponding conductive track contact into contact with a respective conductive ink track; and a wiper housing including at least two openings at least partially enclosing the conductive internal plate and the at least two cylindrical springs. In one example, the method further comprises, at the fuel level sensor assembly, sending the signal indicative of electrical resistance in the fuel level wiper assembly to a controller; and at the controller, receiving the signal and determining a level of fuel in a fuel tank based on the electrical resistance. In another example, the at least two conductive track contacts remain in direct spring loaded contact with the at least two conductive ink tracks as the fuel level wiper assembly rotates and moves through its travel responsive to a change in the fuel level. In yet another example, the at least two cylindrical springs are compressed and exert axial forces on at least two conductive spacers, where each of the conductive spacers are positioned between the corresponding cylindrical spring and the conductive track contact. In another example, the at least two openings are formed as hollow cylinders with cut-outs that each receive a spring contacting protrusion included in the conductive internal plate, and where the hollow cylinders at least partially circumferentially enclose the spring contacting protrusions. In yet another example, the conductive internal plate includes a body that extends between the spring contacting protrusions.

In any of the aspects or combinations of the aspects, the fuel level sensor wiper assembly may further comprise at least two conductive spacers each of which are positioned between the corresponding cylindrical spring and the conductive track contact.

In any of the aspects or combinations of the aspects, the at least two conductive spacers may each be cylindrical and include an end in face sharing contact with the corresponding cylindrical spring.

In any of the aspects or combinations of the aspects, at least a portion of the at least two conductive spacers may extend outwardly from the at least two openings.

In any of the aspects or combinations of the aspects, the at least two openings may be formed as hollow cylinders.

In any of the aspects or combinations of the aspects, the at least two cylindrical springs may be compressed when installed in the fuel level sensor wiper assembly.

In any of the aspects or combinations of the aspects, the conductive internal plate may include at least two spring contacting protrusions and a body that extends between the at least two spring contacting protrusions.

In any of the aspects or combinations of the aspects, the conductive internal plate may be over-molded in the housing and the at least two spring contacting protrusions may be arranged at bases of the at least two openings.

In any of the aspects or combinations of the aspects, the fuel level wiper assembly may further comprise a bearing positioned in the wiper housing, where the wiper housing may pivot about the bearing.

In any of the aspects or combinations of the aspects, a pair of spring contacting protrusions in the conductive internal plate may each mate with an interior orifice of the corresponding cylindrical spring.

In any of the aspects or combinations of the aspects, each of the openings in the pair of openings may at least partially circumferentially enclose spring contacting protrusions in the conductive internal plate, the pair of cylindrical springs, and the pair of conductive spacers.

In any of the aspects or combinations of the aspects, each of the openings may receive one of the spring contacting protrusions in the conductive internal plate.

In any of the aspects or combinations of the aspects, a body of the conductive internal plate may be over-molded in the wiper housing.

In any of the aspects or combinations of the aspects, the fuel level sensor may be coupled to a fuel delivery module housing.

In any of the aspects or combinations of the aspects, the fuel level sensor wiper assembly may be included in a hybrid vehicle.

In another representation, an in-tank fuel level sensor in a fuel level module is provided that comprises a spring loaded wiper device that includes a wiper body with bores that at least partially enclose a conductive plate and conductive springs that press conductive contacts against an ink track in a ceramic substrate as the wiper device rotates.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types as well as various hybrid vehicle configurations. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. Thus, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel delivery system, comprising:
at a fuel level sensor assembly, generating a signal indicative of electrical resistance in a wiper assembly while at least two spring-loaded conductive track contacts of the wiper assembly are each in contact with a conductive ink track, where the wiper assembly includes:
at least two cylindrical springs positioned between the at least two conductive track contacts and a conductive internal plate, each spring urging a corresponding conductive track contact into contact with a respective conductive ink track; and
a wiper housing including at least two openings formed as hollow cylinders that each at least partially enclosing the conductive internal plate and a corresponding cylindrical spring.

2. The method of claim 1, further comprising:
at the fuel level sensor assembly, sending the signal indicative of the electrical resistance in the wiper assembly to a controller; and
at the controller, receiving the signal and determining a level of fuel in a fuel tank based on the electrical resistance.

3. The method of claim 2, where the at least two spring-loaded conductive track contacts remain in direct contact with the respective conductive ink tracks as the wiper assembly rotates and moves through its travel responsive to a change in the fuel level.

4. The method of claim 1, A method for a fuel delivery system, comprising:
at a fuel level sensor assembly, generating a signal indicative of electrical resistance in a wiper assembly while at least two spring-loaded conductive track contacts of the wiper assembly are each in contact with a conductive ink track, where the wiper assembly includes:
at least two cylindrical springs positioned between the at least two conductive track contacts and a conductive internal plate, each spring urging a corresponding conductive track contact into contact with a respective conductive ink track; and
a wiper housing including at least two openings at least partially enclosing the conductive internal plate and the at least two cylindrical springs,
where the at least two cylindrical springs are compressed and exert axial forces on at least two conductive spacers, where each of the conductive spacers are positioned between the corresponding cylindrical spring and the spring-loaded conductive track contact.

5. The method of claim 4, where the at least two openings are formed as hollow cylinders that each receive a spring contacting protrusion included in the conductive internal plate, and where the hollow cylinders at least partially circumferentially enclose the spring contacting protrusions.

6. The method of claim 5, where the conductive internal plate includes a body that extends between the spring contacting protrusions.

7. A fuel level sensor, comprising:
a wiper assembly comprising:
a pair of conductive track contacts each contacting a conductive ink track on a card at their first ends and a pair of conductive spacers at their second ends;
a pair of cylindrical springs positioned between a conductive internal plate and first ends of the pair of conductive spacers and biasing the pair of conductive spacers; and
a wiper housing including a pair of openings that at least partially enclose the conductive internal plate and the pair of cylindrical springs, where each of the pair of cylindrical springs is compressed and exert axial forces on a corresponding conductive spacer, where each of the conductive spacer positioned between the corresponding cylindrical spring and the conductive track contact.

8. The fuel level sensor of claim 7, where a body of the conductive internal plate is over-molded in the wiper housing.

9. The fuel level sensor of claim 7, where the fuel level sensor is coupled to a fuel delivery module housing.

10. The fuel level sensor of claim 7, where a pair of spring contacting protrusions in the conductive internal plate are each mated with an interior orifice of the corresponding cylindrical spring.

11. The fuel level sensor of claim 10, where each of the openings in the pair of openings at least partially circumferentially enclose spring contacting protrusions in the conductive internal plate, the pair of cylindrical springs, and the pair of conductive spacers.

12. The fuel level sensor of claim 11, where each of the openings receive one of the spring contacting protrusions in the conductive internal plate.

* * * * *